United States Patent [19]
Curtis

[11] Patent Number: 5,622,266
[45] Date of Patent: Apr. 22, 1997

[54] GARDEN SIEVE FOR WHEELBARROW

[76] Inventor: Thomas M. Curtis, 1385 York Ave., New York, N.Y. 10021

[21] Appl. No.: 520,052

[22] Filed: Aug. 28, 1995

[51] Int. Cl.⁶ .................................................. B07B 1/00
[52] U.S. Cl. ...................... 209/235; 209/322; 209/332; 209/365.1; 209/411; 209/417; 209/420
[58] Field of Search ................................ 209/235, 320, 209/322, 332, 333, 337, 342, 341, 365.1, 366, 405, 408, 409, 411, 412, 417, 420, 421; 280/47.31

[56] References Cited

U.S. PATENT DOCUMENTS

| 311,485 | 2/1885 | Gridley et al. |
|---|---|---|
| 517,724 | 4/1894 | Beers. |
| 2,767,886 | 10/1956 | Jenkins ............................. 280/47.31 X |
| 3,315,807 | 4/1967 | Rosen .................................. 209/337 X |
| 3,426,898 | 2/1969 | Cruickshank. |
| 3,640,386 | 2/1972 | Frangos ................................... 209/337 |
| 4,350,584 | 9/1982 | Donington ............................. 209/352 |
| 5,374,095 | 12/1994 | Ramseth ........................... 280/47.31 X |

FOREIGN PATENT DOCUMENTS

| 353604 | 5/1961 | Switzerland ........................... 209/342 |

*Primary Examiner*—David H. Bollinger
*Attorney, Agent, or Firm*—Schweitzer Cornman & Gross

[57] ABSTRACT

A garden sieve for a wheelbarrow has a collar frame adapted to conform to and fit loosely on the rim of a wheelbarrow. A sieve frame connected to the collar frame supports a wire screen adapted for sifting granular material. A motor can be connected between the wheelbarrow and the sieve to reciprocate the wire screen. The frame can include a partially removable gate for the removal of strained material and can include roller bearings to reduce friction between the sieve and the wheelbarrow.

7 Claims, 2 Drawing Sheets

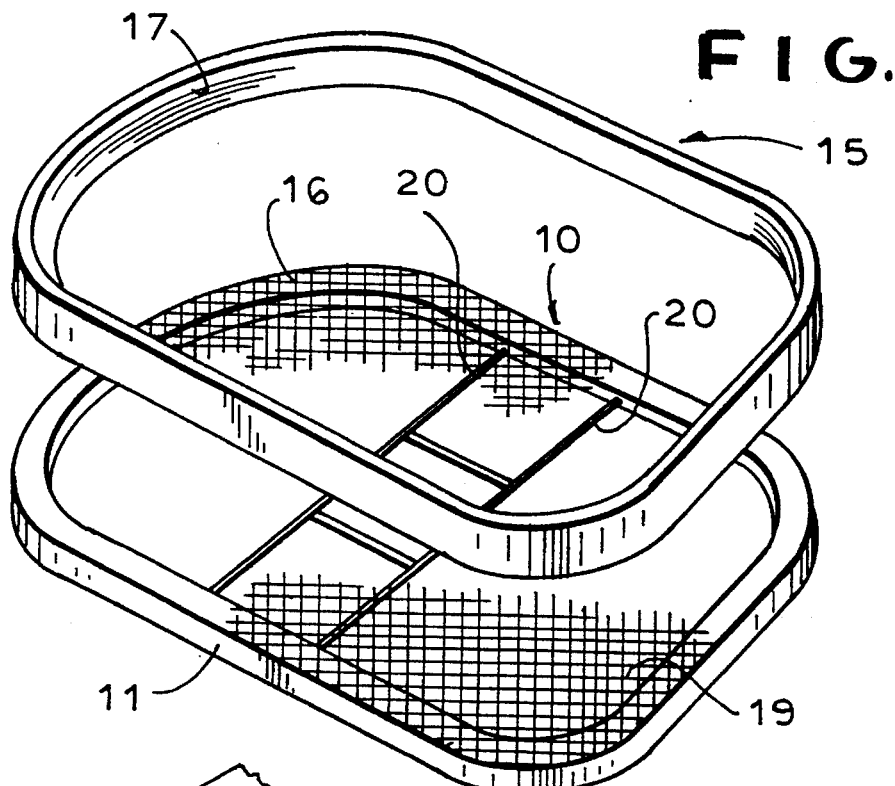
FIG. 3
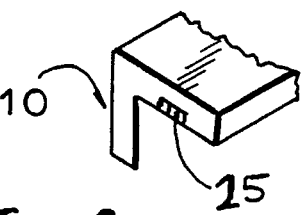
FIG. 4a
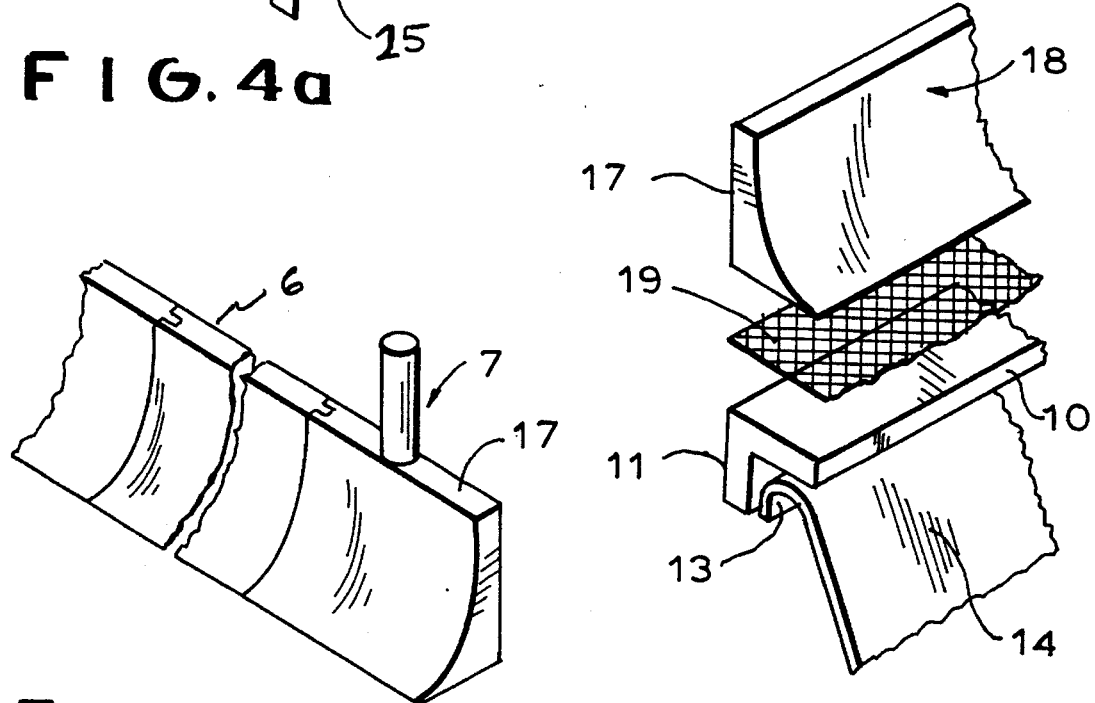
FIG. 5
FIG. 4

GARDEN SIEVE FOR WHEELBARROW

BACKGROUND OF THE INVENTION

This invention relates to a new and improved sieve for sifting stones and gravel from garden soil by moving, vibrating, or shaking the new sieve across the top surface of a wheelbarrow or comparable vessel. The new sieve may also be used for sifting fine sand from coarse sand and gravel or for separating any fine product from a mixture. The invention is specifically designed to accommodate a wheelbarrow or other receiver whose shape is elliptical or oblong with rounded ends, although it may be adapted for use with a rectangular or square receiver.

Known garden sieves of this general type are shown in U.S. Pat. Nos. 4,350,584, Donington; 3,426,898, Cruickshank; 1,629,149, Citrin; 1,424,451, Crandall; 517,724, Beers; and 311,485, Gridley & Johnson.

The typical garden sieve consists of a flat rectangular frame, typically made of wood, with a wire screen or mesh affixed to the underside. Its principal use is to remove stones and gravel from garden soil in small quantities. It is utilized by propping it at an angle or setting it on a frame above the ground. The work is laborious and time consuming. Large processing equipment designed for singular, specific processing of far larger quantities than that contemplated herein exists but is uneconomical and unsuitable for ordinary garden use.

If a rectangular sieve is placed on an elliptical wheelbarrow pan a good portion of the surface area of the receiver is missed and/or the top plane of the receiver is open permitting contamination of screened material by unscreened material as it is shoveled into the sieve or screen. The modern wheelbarrow is typically not rectangular (or square) as 90 degree corners and vertical surfaces do not permit stacking of the pan or receiver for shipment. In addition, the typical wheelbarrow pan has compound curves to facilitate the mixing of concrete or mortar.

SUMMARY OF THE INVENTION

The present invention is directed to an improved garden sieve for ready and simple mounting on a wheelbarrow or other receiver where the frame of the sieve matches the shape and contours of the top edge of the wheelbarrow. The sieve frame of the new unit is sized so as to have sufficient play to permit the sieve to be moved in the horizontal plane by hand or by motor while at all times maintaining the screen area of the sieve over the wheelbarrow pan or other receiver.

DESCRIPTION OF THE DRAWINGS

FIG. 3 is an exploded view of the three basic components of the new wheelbarrow sieve;

FIG. 4 is an enlarged, exploded perspective view of the sieve frame and wheelbarrow lip to show the juxtaposition of the lower sieve frame and the upper edge of the wheelbarrow;

FIG. 4a is a schematic perspective view of the lower sieve frame showing an alternate embodiment which contains a beating race; and FIG. 5 is a schematic perspective view of the upper sieve frame showing a preferred contour and a gate.

DETAILED DESCRIPTION OF THE INVENTION

Figure 1:
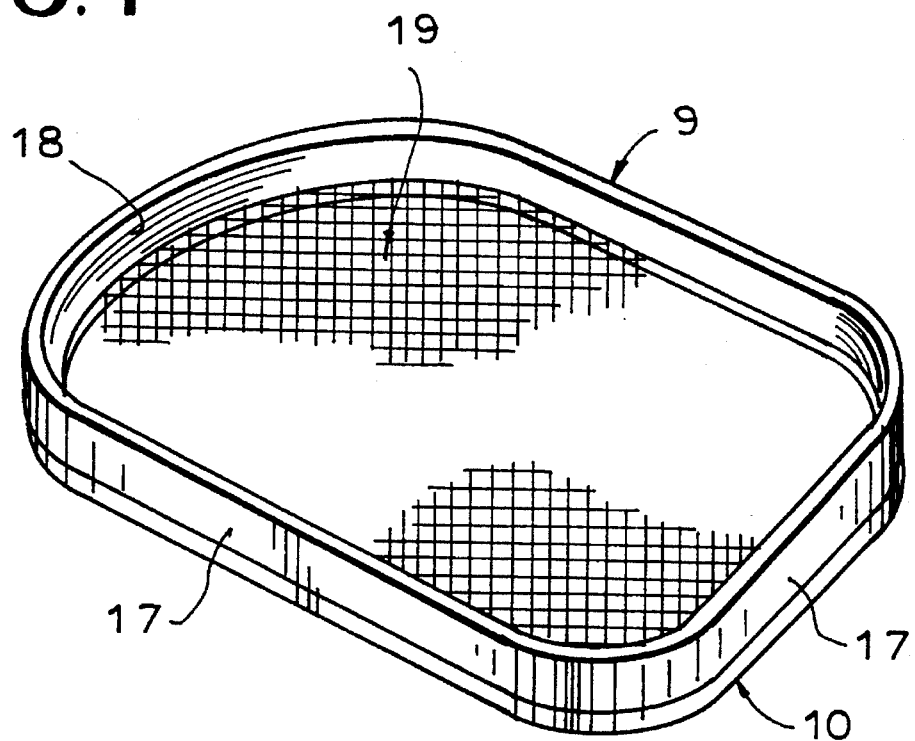
FIG. 1 is a perspective view of the new sieve.
Figure 2:
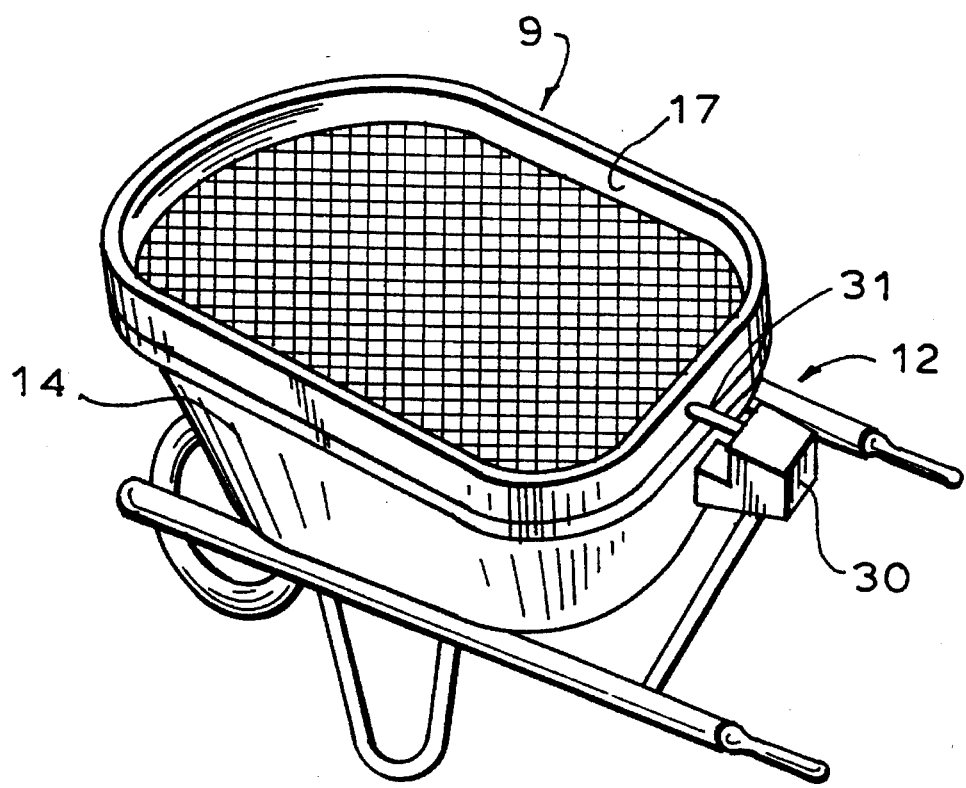
FIG. 2 is a perspective view of a wheelbarrow and the new sieve in place thereover.

The new sieve unit 9 of the invention includes a screen 19 supported in a sieve frame 15 attached to a lower sieve collar 10 having an L-shaped flange 11 to keep the entire sieve unit 9 in operative association with the wheelbarrow 12 as the sieve unit 9 is moved, shaken, or vibrated while mounted on the wheelbarrow in accordance with the principles of the invention. The flange 11 is designed to be continuous and generally congruent in its circumferential shape with the circumferential shape of the lip 13 of the wheelbarrow pan 14 so that the unit 9 may be displaced a preset distance in a horizontal plane in any direction from the lip 13, which displacement travel is limited by the overall outer dimensions of the flange 11. In accordance with the invention, screened material cannot fall outside the wheelbarrow and the unscreened material which is shoveled at the sieve cannot enter the wheelbarrow. The flange 11 also keeps the sieve frame from sliding off the wheelbarrow as the mixture of coarse and fine soil or other material to be sifted is shoveled onto the sieve unit.

The upper sieve frame 15 is designed so that its lower periphery mates with the upper peripheral edge 16 of the lower sieve collar 10. The upper frame 15 includes a circumscribing wall 17 with a concave inside surface 18 to minimize the weight of the sieve and to prevent material buildup. A wire screen 19 is fastened between the upper frame 15 and the collar 10 to establish the new sieve unit 9.

The frame 15 and collar 10 are congruent with the top edge of the wheelbarrow pan or other vessel. Thus a matching sieve must be manufactured for any given receiver and to match the shape of the top edge of the pan.

In its simplest version, the sieve unit of the invention includes three elements which are suitably fastened together by screws, bolts, rivets, or the like, namely the bottom collar 10 with its L-shaped flange 11 which permits a limited movement across the surface of the lip of the wheelbarrow, the wire screen 9 and the upper sieve frame 15 to match the shape of the collar 10 in its horizontal plane. The gauge of the wire screen 19 and its mesh size can be varied to suit the size of the sifted material which is to pass through. The vertical dimension of the upper frame 15 is sized to permit easy containment of unit volumes of the material with which it will be used. For example, for screening topsoil in the garden, a wall 17 height of 2" to 6" is adequate, but the particular height is not critical to the efficacy. The screen 9 may also be supported by the use of reinforcing rods 20 spanning the collar 10, which rods will also add structural integrity to the entire sieve unit 9.

In the simplest embodiment of the invention, the sieve unit is manually shaken to separate the larger particles such as stones from garden soil. For this purpose, one or more handles 7 (FIG. 5) are affixed to the wall 17 to facilitate manual gripping of the unit 9 for shaking over the wheelbarrow pan. In this embodiment, the stones or materials which remain above the screen may be removed easily by the gardener by lifting the unit 9 and inverting the sieve.

If desired a removable gate 6 (FIG. 5) may be formed in the sieve frame to facilitate removal of unscreened materials without separating the sieve from the wheelbarrow. The gate may be formed by making a section of the frame wall 17 separable (by suitable hardware or with a tongue-and groove joint as shown) or hingeable so as to "open" the sieve frame as will be understood.

The wheelbarrow sieve of the invention may be motorized in two distinct configurations depending on the capacity and speed desired. One version is equipped with an orbital electric motor (not shown) rigidly mounted (by bolts or the like, not shown) approximately in the center of the wheelbarrow pan. The orbital electric motor may itself be removable from its location in the pan so that the wheelbarrow may be used for other purposes. Any orbital electric motor of sufficient capacity such as those commonly used for orbital sanders will suffice to vibrate the sieve unit 9 provided that the degree of travel is not greater than the "play" along or across the congruent horizontal surface of the lower frame where it engages the lip of the wheelbarrow pan.

Another version of the motorized sieve unit contemplates an externally mounted reciprocating motor 30 such as that commonly used for a reciprocating hand saw. The motor output is delivered through driver arm 31. The reciprocating driving arm 31 is operatively associated with the sieve wall 17 to shake the unit 9 with respect to the pan 14. This motor may be located on the long axis, preferably at the operator end of the wheelbarrow, that is between the handles and affixed securely to the exterior of the wheelbarrow pan so that the reciprocating shaft of the motor can move the sieve along the long axis a distance equal to the "play" along the congruent lip of the bottom frame where it meets the wheelbarrow pan.

It is contemplated that the sieve will be constructed of molded plastic, e.g. polyethylene. The sieve may also be constructed out of metal. The portion of the lip which meets the top edge of the wheelbarrow pan advantageously is smooth and slippery (low friction) in order to permit the required movement and a Teflon (PTFE) coating may be employed for this purpose. Depending on the capacity desired, the weight of material on the wire screen to be processed, it will be advantageous to reduce friction by the use of a low friction material (PTFE), or to use roller bearings 25 in the collar 10 (FIG. 4*a*).

If desired a removable gate 6 (FIG. 5) may be formed in the sieve frame to facilitate removal of unscreened materials without separating the sieve from the wheelbarrow. The gate may be formed by making a section of the frame wall 17 separable (by suitable hardware) or hingeable so as to "open" the sieve frame as will be understood.

Although the foregoing description has been given by way of preferred embodiment, it will be understood by those skilled in the art that other forms of the invention falling within the ambit of the following claims is contemplated. Accordingly, reference should be made to the following claims in determining the full scope of the invention.

I claim:

1. A garden sieve for a wheelbarrow pan of predetermined shape comprising:

(a) a collar frame with an L-shaped flange congruent with the top edge of the wheelbarrow pan and adapted to fit loosely on said wheelbarrow pan to permit a limited horizontal movement of the collar in any direction;

(b) a sieve frame of sufficient size and strength to contain a unit volume of material to be sifted; and (c) a wire screen mounted in said sieve frame.

2. A garden sieve according to claim 1 wherein (a) the sieve frame is provided with a handle means for manual vibration.

3. A garden sieve according to claim 1 further comprising an orbital motor centrally mounted to the wheelbarrow pan and connected to said sieve for vibrating the sieve.

4. A sieve according to claim 1 further comprising a reciprocating motor mounted on the exterior of the wheelbarrow pan and connected to said sieve to reciprocate said sieve along an axis in the horizontal plane across the top of the wheelbarrow.

5. A sieve according to claim 1 wherein (a) said sieve is fitted with a partially removable gate to facilitate removing stones or other remaining material without separating said sieve unit from the wheelbarrow.

6. A sieve or screen according to claim 1 wherein (a) said sieve is fitted with at least one rod extending across said sieve frame and under the wire screen.

7. A sieve or screen according to claim 1 further comprising a series of roller bearings to reduce friction between said sieve and the wheelbarrow.

* * * * *

UNITED STATES PATENT AND TRADEMARK OFFICE
CERTIFICATE OF CORRECTION

PATENT NO.    : 5,622,266
DATED         : April 22, 1997
INVENTOR(S)   : Thomas M. Curtis It is certified that error appears in the above-identified patent and that said Letters Patent is hereby corrected as shown below:

Column 4,
Line 9, "...a bearing race;..." as per original submission. (Text of patent issued states "...a beating race;...")

Signed and Sealed this

Twenty-first Day of May, 2002

*Attest:*

*Attesting Officer*

JAMES E. ROGAN
*Director of the United States Patent and Trademark Office*